з,491,064
Patented Jan. 20, 1970

3,491,064
PROCESS FOR PRODUCING WATER-SOLUBLE NITROGEN-CONTAINING PRODUCTS BY REACTING A COMPOUND CONTAINING A

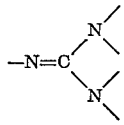

GROUP WITH FORMALDEHYDE AND FREE AMINES
Heinz Enders, Stadtbergen, Augsburg, Gunter Pusch, Leitershofen, Augsburg, and Dieter Walz, Friedberg, Augsburg, Germany, assignors to Chemische Fabrik Pfersee G.m.b.H., Augsburg, Germany, a firm of Germany
No Drawing. Filed June 8, 1966, Ser. No. 555,966
Claims priority, application Germany, June 26, 1965, C 36,239
Int. Cl. C08g 9/14, 9/08
U.S. Cl. 260—72                    9 Claims

ABSTRACT OF THE DISCLOSURE

Water-soluble nitrogen containing condensation products are produced by reacting a compound having the group

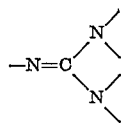

an aqueous solution of a low monovalent aldehyde and an ammonium salt of a strong acid including in the reaction from 0.05 mol to 0.25 mol of an amine containing at least one amine hydrogen atom per 1 mol of said compound.

---

This invention relates to a process of producing condensation products and refers more particularly to a process of producing water-soluble nitrogen-containing condensation products, products produced by such process and textiles treated thereby.

It is known in prior art that cyanamide and its polymers may be reacted in a single step reaction or a reaction of several steps with ammonium salts or salts of amines and with aldehydes so as to produce condensation products which improve the washing fastness of dyes upon textiles.

These products have the drawback that they produce a substantial change in coloration, or are susceptible to sulfate ions, that is, their effect is diminished in the presence of such ions which may come from the dyeing, or deposits are produced which can cause the formation of spots.

An object of the present invention is to improve these prior art processes.

Other objects will become apparent in the course of the following specification.

In the accomplishment of the objectives of the present invention it was discovered that these prior art drawbacks can be eliminated when compounds having the group

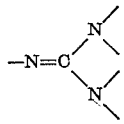

ammonium salts of strong inorganic acids and aldehydes in aqueous solution are reacted with each other in the presence of small amounts of free amines, whereby short time periods of reaction were found to be adequate.

The surprising effect which has been observed is that these products are stable against sulfate ions and also that they produce no or only very little change in colour.

As the compound of the group

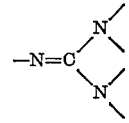

dicyandiamide comes into question in the first place. However, dicyandiamide, as well as guanadine and its acyl derivatives, such as acetoguanidine or biguanide, are also suitable.

As far as ammonium salts are concerned, ammonium chloride is the first to be considered, but salts of other strong acids, such as those of nitric acid, are also useable.

As aldehyde formaldehyde is preferred in the form of a 30 to 40% solution, but other low monovalent aldehydes can be used as well. Said free amine is in addition to and distinct from said compound having the group

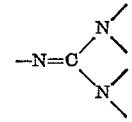

As far as amines are concerned which are used in small amounts during the condensation, divalent and polyvalent amines are preferred, such as ethylene diamine, propylene diamine, diethylene triamine and triethylene tetramine. Also suitable are their oxyalkyl derivatives, substituted at the nitrogen, such as mono-, di-, or tri-oxyethylethylene diamine, or the corresponding oxyethyl derivatives of diethylene triamine, or mono- or diethanol amine, as well as mono- or dipropanol amine; however, they produce somewhat less valuable products. Less suitable are also the low molecular aliphatic monamines, such as methyl-, ethyl-, propyl- or butylamine. It should be stated in general that amines must have at least one hydrogen atom bound to nitrogen.

The proportions of the amounts of the individual components are so related to each other that for 1 mol of the compound of the group

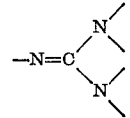

there are provided 1.5 to 2.7 mols aldehyde, particularly formaldehyde in the form of its 30 to 40% aqueous solution in the presence of 0.8 mol to 1.6 mol ammonium salt and 0.05 mol to 0.25 mol of free amine.

After the components are mixed, as a rule reaction starts already when they are slightly heated to 25° C. to 30° C., whereby the temperature rises to boiling, so that it is advantageous to operate with a reflux condenser.

The amount of the products of the present invention which is applied depends upon the shade of the dye, upon their use either in the dye bath or in a subsequent treatment and upon the manner of operation. In an impregnating process about 5 to 30 gr. of the 100% product per liter are used, in an exhaustion process 0.25 to 1.5% of the weight of the goods. The products are applied in the usual known manner.

The following examples are given by way of exemplification only:

EXAMPLE 1

84 parts by weight dicyandiamide, 220 parts by weight of a 30% aqueous formaldehyde solution and 43 parts by weight of ammonium chloride are introduced into a flask provided with a stirrer, a thermometer and a reflux condenser; then at room temperature 7.7 parts by weight of ethylene diamine (78%) are added while stirring. Due to the exothermic reaction the temperature rises quickly to 90° C.–95° C. This temperature is allowed to stay until the reaction is terminated in about 10 minutes. Thereafter water is added to dilute a concentration of 45% solid substance and cooled. The product obtained is clearly soluble in water.

It is possible to add to 100 ml. of a solution of 10 gr. of this product in 1 liter water at 20° C. up to 15 ml. of a 1% aqueous sodium sulfate solution (calc.) without producing any turbidity, while a product produced in the same manner but without the addition of ethylene diamine can receive under the same conditions only about 3 ml., sodium sulfate solution (1%) before turbidity starts.

The product produced in accordance with the present invention improves the wet fastness of direct colorations as compared to untreated goods and depending upon the dye being used by 1–3 fastness degrees. When goods are treated by a product produced in the same manner but without ethylene diamine, the fastness is improved only to a small extent.

EXAMPLE 2

To 84 parts by weight of dicyandiamide, 165 parts by weight of a 40% formaldehyde solution and 43 parts by weight of ammonium chloride, dissolved in 120 parts by weight water, are added while stirring 10 parts by weight monoethanol amine at room temperature. Then the procedure is the same as that described in Example 1.

This product is also easily diluted with water, it improves the fastness of dyes and is considerably more stable as far as sulfate ions are concerned than a product produced without the addition of monoethanol amine.

EXAMPLE 3

84 parts by weight of dicyandiamide, 200 parts of weight of a 30% formaldehyde solution and 72 parts by weight of ammonium nitrate are reacted while stirring with 9 parts by weight ethylamine under conditions described in Example 1. The product which is obtained is somewhat less stable against sulfate ions, but is more stable than a product produced in the same manner but without the use of ethylamine.

EXAMPLE 4

84 parts by weight of dicyandiamide are reacted with 130 parts by weight of aqueous (40%) formaldehyde solution, 69 parts by weight ammonium chloride and 9 parts by weight diethylene triamine in the manner described in Example 1. The product thus obtained has essentially the same properties.

A similar product is also produced when 102 parts by weight of dicyandiamine are used in the reaction instead of dicyandiamide.

It is apparent that other variations and modifications may be made in the described examples within the scope of the present invention. All such variations and modifications are to be included within the scope of the present invention.

What is claimed is:

1. In a process of producing water-soluble nitrogen-containing products by reacting 1 mol of a compound selected from the group consisting of dicyandiamide, dicyandiamidine, guanadine and its acyl derivatives and having the group

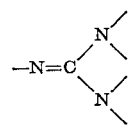

with 1.5 to 2.7 mols formaldehyde in the form of an aqueous solution and 0.8 to 1.6 mol of an ammonium salt of a strong inorganic acid, the improvement which comprises including in the reaction from 0.05 mol to 0.25 mol of a free amine containing at least one amine hydrogen atom per 1 mol of said free amine, said free amine being in addition to and distinct from said compound.

2. The process in accordance with claim 1, wherein said amine is a monoamine.

3. The process in accordance with claim 1, wherein said amine is a polyamine.

4. The process in accordanec with claim 1, wherein said amine is substituted at nitrogen by alkylol groups with 2 to 5 C atoms but still contains at least 1 amine hydrogen atom.

5. The process in accordance with claim 1, wherein said compound is dicyandiamide.

6. The process in accordance with claim 1, wherein said ammonium salt is ammonium chloride.

7. The process in accordance with claim 1, wherein said amine is alkylene diamine.

8. The process in accordance with claim 1, wherein said amine is a polyalkylene polyamine the alkylene group of which contain 2 to 3 C atoms.

9. A water-soluble nitrogen-containing condensation product resulting from the process set forth in claim 1.

References Cited

UNITED STATES PATENTS

| | | | |
|---|---|---|---|
| 2,567,238 | 9/1951 | Sellet et al. | |
| 2,774,749 | 12/1956 | Stanley et al. | |
| 2,822,312 | 2/1958 | Bretscher et al. | |
| 2,902,472 | 9/1959 | Cook et al. | 260—72 |
| 2,214,067 | 9/1940 | Petersen | 8—74 |
| 2,328,900 | 9/1943 | Grimm et al. | 8—74 |
| 2,405,863 | 8/1946 | Treboux | 260—69 |
| 2,950,268 | 8/1960 | Cofrancesco | 8—74 |

WILLIAM H. SHORT, Primary Examiner

E. WOODBERRY, Assistant Examiner

U.S. Cl. X.R.

8—18, 74